United States Patent Office 3,328,477
Patented June 27, 1967

3,328,477
MILD AND SELECTIVE HYDROGENATION WITH A TOWN-GAS CATALYST
William F. Taylor, Scotch Plains, and John H. Sinfelt, Berkeley Heights, N.J., assignors to Esso Research and Engineering Company, a corporation of Delaware
No Drawing. Filed Mar. 13, 1964, Ser. No. 351,854
6 Claims. (Cl. 260—677)

This invention relates to the use of spent Town Gas catalysts which have become partially deactivated in a low temperature reaction of light hydrocarbons with steam to produce methane-rich gas products, the thus deactivated Town Gas catalyst being useful for selective hydrogenation reactions where a mild hydrogenation function is needed, i.e., the catalyst having a suitable low nickel surface area.

In the low-temperature process for producing a methane-rich Town Gas product, the light hydrocarbon reactants or hydrocarbon mixtures used as a feed for conversion with steam are preferably paraffinic hydrocarbons and in the $C_5$ to $C_8$ range. The nickel catalyst suitable for this conversion at temperatures in the range of 600° to 925° F., and preferably 650° to 900° F., should have a high nickel surface area in the range of 20 to 30 m.$^2$/g. of catalyst which contains also alumina and preferably a suitable promoter. The fresh catalyst of Ni with silica made by coprecipitation has higher surface areas. After the catalyst has been used for a satisfactory length of time for the Town Gas process so that the feed conversion or product quality can be maintained no longer, the catalyst cannot be used further for the reaction because no effective regeneration procedure exists. The highly active Town Gas catalysts of high nickel surface area have been found to have good catalyst activity maintenance or catalyst life for as long as 60 days and longer. At the end of this period of use as a Town Gas catalyst, these catalysts have retained a certain nickel surface area which gives these catalysts their utility as mild hydrogenation catalysts in lower temperature reactions. Although it is possible to rework the spent Town Gas catalyst to recover the metals, e.g., nickel, promoters, and aluminum, the reworking process to recover the metals is expensive, adding up to a large proportion of the fresh catalyst cost.

In accordance with the present invention, it has been found that the spent or partially deactivated Town Gas catalyst can be used for a variety of hydrogen reactions which require mild or selective hydrogenation activity, as for example, for selective hydrogenation of diolefins in a mixed monoolefin-diolefin hydrocarbon stream with economical and technical advantages over other kinds of catalysts prepared purposely for use as mild hydrogenation catalysts. These reactions which use a mild hydrogenation catalyst are generally carried out at lower temperatures than the Town Gas process temperatures.

Hydrogenation catalysts have been classified usually into two main groups: Group I—vigorous hydrogenation catalysts and Group II—mild (selective) hydrogenation catalysts.

The fresh high surface area Town Gas catalysts definitely belong in Group I in that they are very active for carrying out reactions to the greatest possible extent, i.e., to thermodynamic equilibrium. A partially deactivated or spent Town Gas catalyst belongs in Group II because it is less active, mostly due to its lower nickel surface area.

Included among the reactions in which a mild hydrogenation catalyst is required are the following:

(1) Selective hydrogenation
 (a) Hydrogenation of one type of olefin in a stream containing mixed olefins
 (b) Partial hydrogenation of polyolefinic compounds, e.g., dienes and acetylenes
(2) Reduction of aldehydes and ketones to form alcohols
(3) Reduction of acids and esters to form alcohols
(4) Reduction of hydroxy compounds to form hydrocarbons It is known that many different kinds of mild hydrogenation catalysts have been developed. They include catalysts in which the main catalytic component is copper, zinc oxide, chromium oxide, nickel sulfide, palladium or platinum. Such metals or metal compounds have usually been applied on support materials such as pumice, alumina or silica by impregnation with specific preparation techniques for obtaining many of these catalysts which are expensive to prepare. They may be poisoned by one type of material or another, e.g., by carbon monoxide in some instances or by sulfur compounds in other instances. They vary in their tendencies to cause breaking of carbon-to-carbon bonds or splitting of the organic molecules which are being treated. They also vary in their tendencies to cause polymerization of the unsaturated compounds treated or formed.

It has been found in accordance with the present invention that the partially deactivated Town Gas catalysts, which when freshly prepared have high total and nickel surface areas, reach a partially deactivated state in which the surface areas will remain suitable at a stable level and the catalyst becomes a mild and selective type of hydrogenation catalyst. These spent Town Gas catalysts are characterized by having nickel surface areas which are from 45 to 5% and total surface areas from 30 to 70% of the freshly prepared Town Gas catalyst. In other words, the total surface area of the spent catalyst is in the range of 45 to 100 m.$^2$/g. and the nickel surface area is in the range of 1 to 10 m.$^2$/g. These surface areas are determined by gas adsorption techniques. For the measurement of the total surface area nitrogen adsorption is used in the method of Brunauer, Emmett and Teller (Emmett, P. H., Advances in Catalysis I, 65 (1948)). For measurement of the nickel surface area, hydrogen chemisorption is employed. The spent Town Gas catalysts are also characterized by sulfur contents of 0.6 wt. percent or less.

The catalysts having high surface areas are prepared by coprecipitation of nickel with alumina as hydroxides, carbonates and basic carbonates from aqueous solutions by adding certain ammonium compounds, e.g., ammonium bicarbonate, to an aqueous solution of nickel nitrate and aluminum nitrate, at temperatures from 32° to 212° F. or the boiling point of the solution, separating the precipitate from the remaining solution by filtration, drying the precipitate at a low temperature, preferably in the range of 200° to 400° F., calcining the dried precipitate in air at a low temperature in the range of 600° to 750° F., and finally reducing the nickel oxide for activation of the catalyst by treatment with hydrogen, preferably at a temperature of 600° to 750° F. Certain metals suitable as promoters are admixed as decomposable compounds, e.g., hydroxides, carbonates or nitrates, with the precipitates, or are coprecipitated. The promoting metals are preferably Ba, Sr, Ce, Cs, La, Y and K, although there are other possible promoters. However, it is important to avoid the presence of metals which have an adverse or inhibiting effect. It is thus to be noted that with the coprecipitation technique employed, there is no need for any washing step to remove Na ions, particularly when using a deionized water to prepare the aqueous salt solutions in which the coprecipitation takes place.

The present application is a continuation-in-part of applications which describe the preparation of the Town Gas catalyst, such as U.S. applications S.N. 317,799, 317,800, 317,777, filed by W. F. Taylor and J. H. Sinfelt on Oct. 21, 1963 and also U.S. application S.N. 327,840 filed by them Dec. 3, 1963.

The high surface area Ni-$Al_2O_3$ catalyst contains 40 to 60 wt. percent Ni with 60 to 40 wt. percent $Al_2O_3$ on a dry basis, the promoting metal being present in a proportion of about 1 to 10 wt. percent of the weight of the catalyst. Through the use of the coprecipitation techniques, the resulting catalyst has an interspersion of the Ni in the alumina structure, in contrast to catalysts made by simply precipitating nickel onto a preformed support. There is evidently an interaction of the nickel interspersed with the alumina and bonding together thereof which gives this kind of catalyst its high surface area and unique properties.

There is a correlation between the catalytic activity of the nickel-alumina and nickel-silica coprecipitation catalysts and their nickel surface areas. The activity of the catalyst in the production of Town Gas, which contains in major proportion $CH_4$ with $CO_2$ and $H_2$, at low temperatures, preferably in the range of 650° to 850° F., can be measured in terms of percent of hydrocarbon feed converted or in terms of product yield, i.e., volume of gas product produced during one hour at a fired set of conditions to space velocity, temperature, pressure, and water to hydrocarbon ratio.

The activity and life of the catalyst are relative measurements based on performance in the conversion of the selected hydrocarbon feed under standardized or comparative test conditions. For example, with a feed of principally n-hexane, this feed mixed with 2 lbs. steam per lb. of hydrocarbon is passed into the catalyst bed at a specified space velocity (w./hr./w.), e.g., 5.6 lbs. hydrocarbon feed per hour per lb. of catalyst. In such a test a low activity Ni on kieselguhr catalyst gives an initial conversion of only 81% and rapidly becomes deactivated so that its life is less than 100 hours. Under the same conditions, a high-activity catalyst such as the nickel-alumina formed by coprecipitation and containing a promoter, gives initial conversions of 97 to 100% and has a life of 400 hours to longer than 1000 hours. The Ba promoted nickel-alumina coprecipitation catalyst has given conversions of 95% and better for 300 hours running under the standardized conditions mentioned. Unpromoted Ni on alumina is approximately in the low class of activity as Ni on kieselguhr. Such comparative runs were made with a tempertaure control for heat transfer from the exothermic zone in the catalyst bed which is toward the exit, to the endothermic zone of the catalyst bed which is toward the inlet. With the high-activity catalyst, the Town Gas process causes the formation of these two zones, and to keep the temperature sufficiently low for high methane formation and longer catalyst life, the temperature control mentioned is used. For example, if the feed mixture of hydrocarbon-steam enters the catalyst bed at 700° F., there is a tendency for the temperature to drop in the front part of the catalyst bed (which is about ¼ to ⅓ of the bed) about 20° to 30° F.; then as the gaseous reaction mixture and product proceed through the remainder of the catalyst bed, the temperature tends to rise about 80° to 140° or more above the inlet temperature depending upon the amount of cooling of this exothermic zone.

The practical Town Gas reaction conditions may be varied from the standardized test conditions with respect to the space velocity, being, for example, in the range of 1 up to 20 w./hr./w., the proportion of steam being varied, for example from 1.5 to 5 lbs. $H_2O$/lb. hydrocarbon feed, the temperatures being varied in the range of 650° to 900° F. and the pressure being in the range of 1 to 100 atmospheres. Under these various conditions the hydrocarbon feed is converted, preferably 90% or above, to a high heating value Town Gas or fuel gas which may have a heating value from 500 to 1000 B.t.u./s.c.f. on account of the high methane content with the other major gaseous components being $H_2$ and $CO_2$.

The following examples are given to illustrate more specifically the method for preparing the Town Gas catalysts, their use for making Town Gas at relatively low reaction temperatures which results in the partial deactivation of the catalysts so that they become spent for the purpose of making Town Gas, but nevertheless have mild hydrogenation activity that can be used in various processes requiring a mild or sensitive hydrogenation catalyst.

*Example 1.—High activity barium promoted Ni—$Al_2O_3$ (coprecipitation) catalyst*

The barium promoted catalyst was made by dissolving 750 g. of $Ni(NO_3)_2.6H_2O$ and 740 g. of $Al(NO_3)_3.9H_2O$ in 3.0 liters of deionized water. Coprecipitation was carried out by adding 1040 g. of $NH_4HCO_3$ while keeping the slurry at 120° F. At the end of the addition, the slurry was stirred an additional 2 hours at 120° F., and then filtered to remove approximately 300 cc. of water from the slurry. To the precipitate paste 17.2 g. of $Ba(NO_3)_2$ dissolved in a little deionized water was added and mixed well. The mixture was dried overnight at 220° F. and then calcined in air for 4 hours at 750° F. The catalyst analyzed 47.6 wt. percent nickel and 2.9 wt. percent barium and had a total surface area of 140 m.$^2$/g. catalyst. The nickel surface area determined by $H_2$ chemisorption was 24.0 m.$^2$/g.

In a similar manner the catalyst was promoted by addition of other proportions of barium nitrate and by the addition of other kinds of promoters such as $Sr(NO_3)_2$, cesium nitrate, lanthanum nitrate, KOH, and yttrium nitrate. It is also possible to make a mixture of Ni—Cu or Ni—Fe coprecipitated Ni-alumina, adding small amounts of iron nitrate or copper nitrate to the aqueous solution in which the coprecipitation takes place. In each instance the amount of the promoting compound added is an amount preferably making the catalyst contain about 0.1 to 6 wt. percent of promoter metal. The promoter metals differ in their effectiveness for promoting the activity of the catalyst for the reaction, as for example, barium being superior to Cs which in turn is superior to Sr and to K. Some of the promoters are more effective in higher amounts, as for example, 6 wt. pecent Ba is much more effective than 3 wt. percent.

As the high activity maintenance catalysts used for making Town Gas decline in activity gradually, in a practical operation it is desirable to raise the temperature of the feed mixture approximately 5° F. in each succeeding 50 to 70 hours. For example, starting at a temperature between 660° and 680° F., during the first 181 hours a conversion of 98.2 to 98.8% of the gas is obtained and the quality of the gas is maintained close to 954 B.t.u./s.c.f., then after an additional 57 hours the inlet temperature of the feed mixture is raised to 685° F. to keep the conversion about 96% and obtain a product of the same quality. This periodic increase of the inlet temperature is conducted so that after 900 hours the feed mixture inlet temperature is increased up to 740° F. and the conversion level has been maintained close to 96%, and the gas product quality in terms of heating value continues to be as high as 954 B.t.u./s.c.f. This is typical of a life test run with a Ba-promoted Ni—$Al_2O_3$ catalyst made by the coprecipitation technique using a space velocity of 2.8 w./hr./w. at 500 p.s.i.g. with 2 lbs. steam per lb. hydrocarbon. After 1000 hours the deactivation of the catalyst became pronounced and it was not practical to continue the run further with the thus spent catalyst.

Similar life runs were made with the catalyst using the other promoters, e.g., K promoted Ni-alumina formed by coprecipitation and used in a run of 1278 hours, the first 1016 hours being run at a constant feed inlet of 700° F. to determine the rate of decline of conversion. With this catalyst at constant 700° F. inlet temperature, the percent of n-hexane conversion remained above 90% for over 500 hours.

Inspections of these spent long-life Town Gas catalysts indicate a relationship of the declining surface areas to their activities for converting the naphtha hydrocarbons to high B.t.u. gas products. This is illustrated by the following inspections of the fresh catalyst and of the spent catalyst.

TABLE I.—INSPECTIONS OF CATALYST CHARACTERISTICS Ni-Al$_2$O$_3$ (BY COPRECIPITATION CONTAINING 45.7 WT. PERCENT Ni AND 1.4 WT. PERCENT K)

|  | Fresh | Spent |
|---|---|---|
| Total surface area, m.$^2$/g | 152 | 85 |
| Nickel surface area, m.$^2$/g | 22.8 | 5.6 |

The foregoing data show that the total surface area of the spent catalyst is 56% of the total surface area of the fresh catalyst and the nickel surface area 25% of the fresh nickel surface area.

Analyses of the spent catalyst dumped from life test runs showed that there is a small increase in carbon content and sulfur content of the catalyst, and this is considered to have a significant effect on the activity of the catalyst for producing Town Gas. However, from all indications, the loss of nickel surface area is a main factor in the deactivation which results in the formation of the spent catalyst, i.e., spent for the Town Gas reaction.

Exploratory studies made to determine the effect of gas components in the reaction and of temperature on the catalyst stability showed that these catalysts are stable at quite high temperatures, up to 1300° F. in the presence of H$_2$, showing no appreciable decline in nickel surface area, but in the presence of O$_2$ or H$_2$O the decline in nickel surface area becomes significant as the temperature is raised to above 900° F.

It is known that processes have been used to obtain a selective hydrogenation of the more unsaturated hydrocarbons in a mixture of hydrocarbons, e.g., hydrogenation of C$_4$ acetylenes in a mixture with butadiene and butenes with least lowering of butene content. One type of selective hydrogenation for this purpose passes a C$_4$ fraction in gaseous phase with sufficient hydrogen for reaction with the acetylenes over a specially made Cr and K promoted Fe catalyst at 350° to 650° F. under a pressure of 0 to 900 p.s.i.g. Another type of process for this purpose uses a very low surface area carrier, e.g., pumice or clay impregnated by a small amount of palladium as catalyst for treating the C$_4$ fraction in liquid phase with added hydrogen at 30° to 90° F. under higher pressure.

In the higher temperature processes the diolefins and acetylenes tend to polymerize, e.g., at above 245° F. In the extremely low temperature process there are more refrigeration costs, the reaction is slow, and the catalysts tend to be susceptible to poisoning by adsorbed substances, e.g., CO.

The spent Town Gas catalysts of the present invention have hydrogenating activities and surface areas which place them in between the catalysts which are used at temperatures above 350° F. and those used mainly at temperatures substantially below ordinary temperatures. They are inexpensive and less sensitive to poisoning by substances such as CO.

The mild hydrogenation conditions used with the spent Town Gas catalysts are generally: temperatures of 70° to 220° F., pressures of 1 to 30 atmospheres, space velocities of 10 to 60 w./hr./w., i.e., pounds of hydrocarbon feed per hour per pound of catalyst. For selective hydrogenation of acetylenes in the mixture, about 0.5 to 5 moles of H$_2$ are used per mole of hydrocarbon in the hydrocarbon feed. For selective hydrogenation of diolefins in a mixture with monoolefins the conditions are adjusted in this general range, the diolefins being reacted less readily than acetylene but more readily than monoolefins.

The spent Town Gas catalysts have a high reduced Ni content, highly interspersed with the alumina, and compare favorably with the massive Ni catalyst known as the Raney nickel catalyst. The incorporation of the Ni in a porous support can help the diffusion of the gases to the active sites where hydrogen and the most reactive compounds are brought together. The deactivation of the nickel in the catalyst through its use in making Town Gas evidently diminishes the nickel surface area and catalyst activity sufficiently to make the catalyst a mild or selective hydrogenation catalyst and thus minimize the reaction of the hydrocarbon components other than those that are most reactive.

*Example 2*

A fresh Town Gas catalyst prepared as described in Example 1, i.e., a catalyst having a nickel surface area of 24.0 m.$^2$/g., was tested for its hydrogenating activity for obtaining complete hydrogenation of ethylene to ethane. This complete saturation was accomplished by passing hydrogen with ethylene in a mole ratio of 6.7 to 1 at a space velocity of 10.4 (g. ethylene/hr./g. catalyst) through the catalyst bed at temperatures of 95° to 140° F. under a total pressure of one atmosphere. This indicated that such a catalyst has an activity for hydrogenating ethylene not much higher than that of a palladium on alumina catalyst.

Simply by lowering the H$_2$/C$_2$H$_4$ ratio, e.g., down to 2:1, and increasing the space velocity the amount of ethylene hydrogenation is lowered to any desired level.

*Example 3.—Silicate stabilized Ni catalyst*

The catalyst is prepared by adding 50 g. of acid washed kieselguhr to 3.5 liters of deionized water with stirring. To this slurry is added 750 g. of Ni(NO$_3$)$_2$.6H$_2$O and 320 g. of Na$_2$SiO$_3$.9H$_2$O, and the mixture is brought to a boil. To this mixture 800 g. of NH$_4$HCO$_3$ is added to coprecipitate the Ni and silicate ions. After the addition of $$NH_4HCO_3$$

the slurry was boiled an additional 3 hours. The resultant catalyst was dried overnight at 230° F. and calcined for 4 hours at 750° F. After reduction with H$_2$ for 15 hours at 700° F., the Ni surface area was 47 m.$^2$/g. The total surface area was 304 m.$^2$/g. The catalyst after calcination analyzed 43.7 wt. percent Ni.

*Example 4*

The Ni/SiO$_2$ catalyst described in Example 3 was reduced in H$_2$ overnight at 675° F. Then ethylene was passed over the catalyst at a space velocity of 40.3 w./hr./w. at atmospheric pressure at temperatures from 95° to 140° F. with 100% conversion of the ethylene to ethane. A H$_2$ to ethylene ratio of 6.7 to 1 was employed for the reaction.

*Example 5*

A Town Gas catalyst of the kind shown in Examples 1 and 3 after deactivation so as to have the lowered surface areas shown in Table I, can be used for selective hydrogenation of C$_5$ diolefins from a pentene stream containing 1 to 10 wt. percent of the diolefins, the diolefins being converted to pentenes in the operation. The hydrocarbons with 2 to 5 moles H$_2$ admixed per mole of the hydrocarbon are passed through a bed of the catalyst at 1 to 10 atmospheres pressure at a space velocity of 40 g. hydrocarbon per hour per g. of catalyst at 150° F. or lower temperature, depending on the activity of the spent catalyst, to obtain selective hydrogenation of the diolefins.

*Example 6*

A crude C$_4$ fraction containing approximately in vol. percent 37% 1,3-butadiene, 1% acetylenes (vinyl and ethyl), 45% butene, and 17% butane can be passed through the spent Town Gas catalyst of Example 1 with its lowered surface area as shown in Table I at a space velocity of 40 g. per hour per g. of catalyst at 150° F. using a H₂/hydrocarbon ratio of 5/1 and a pressure of 100 p.s.i.g. to obtain selective conversion of the acetylenes to the butadiene and butene.

The invention described is claimed as follows:

1. In a process of mild hydrogenation of an organic compound by catalyzed reaction with hydrogen, the improvement which comprises carrying out said reaction in the presence of a catalyst characterized by containing 40 to 60 wt. percent Ni interspersed with an oxide of the group consisting of $Al_2O_3$, $SiO_2$, and mixtures of $Al_2O_3$ with $SiO_2$, said catalyst having been partially deactivated by being spent in its use for reacting naphtha paraffins with steam for producing a methane-rich gas at 600° to 925° F. with an accompanying decrease in its nickel and total surface areas.

2. In a process as set forth in claim 1, the partially deactivated catalyst which catalyzes the mild hydrogenation being characterized by nickel and total surface areas which are 45 to 5% and 30 to 70% of the nickel and total surface areas of the fresh catalyst as it is initially used in the producing of methane-rich gas.

3. Process for mild hydrogenation of an organic compound which comprises reacting the organic compound with hydrogen at about 70° to 220° F. in the presence of a catalyst containing 40 to 60 wt. percent Ni interspersed with alumina, said catalyst having been partially deactivated by use in reacting naphtha paraffins with steam for producing a methane-rich gas at 600° to 925° F., with an accompanying decrease in its nickel surface area from the range of 20 to 30 m.²/g. to within the range of 1 to 10 m.²/g.

4. A process as set forth in claim 3, in which the organic compound is a $C_2$ to $C_4$ acetylene which is selectively hydrogenated in a mixture with less unsaturated $C_2$ to $C_4$ olefins with the hydrogen in a ratio of 0.5 to 5 moles of hydrogen per mole of hydrocarbon present in said mixture.

5. In a process of mild and selective hydrogenation of an unsaturated hydrocarbon by reaction with sufficient hydrogen to saturate unsaturated carbon-to-carbon bonds of said hydrocarbon at a low temperature below 245° F., the improvement which comprises carrying out said reaction in the presence of a spent Town Gas catalyst which contains 40 to 60 wt. percent Ni interspersed with 60 to 40 wt. percent $Al_2O_3$ and with 1 to 10 wt. percent of a promoting metal of the group consisting of Ba, Sr, Cs, La, Y, Cu, Fe, and K, said catalyst having been prepared to have a nickel a fresh nickel surface area of 20 to 30 m.²/g. and being partially deactivated to have a nickel surface area within the range of 1 to 10 m.²/g.

6. In a process of mild and selective hydrogenation of an unsaturated hydrocarbon by reaction with hydrogen to saturate carbon-to-carbon unsaturated bonds at a low temperature below 245° F., the improvement which comprises carrying out said reaction in the presence of a spent Town Gas catalyst which contains nickel interspersed with silica to give the catalyst a fresh nickel surface area above 20 m.²/g. when freshly prepared and used for converting naphtha paraffins to methane by reaction with steam at 600° to 925° F. and being partially deactivated by lowering of its nickel surface area to 45 to 5% of its fresh nickel surface area when spent.

References Cited
UNITED STATES PATENTS

| | | | |
|---|---|---|---|
| 2,378,969 | 6/1945 | Bailey et al. | 260—677 |
| 2,791,544 | 5/1957 | Eastwood | 208—89 |
| 2,954,339 | 9/1960 | Beavon | 208—216 |

DELBERT E. GANTZ, *Primary Examiner.*

S. P. JONES, *Assistant Examiner.*